United States Patent [19]

Bagley

[11] Patent Number: 4,817,379
[45] Date of Patent: Apr. 4, 1989

[54] JET PROPULSION ENGINE AND METHOD

[76] Inventor: Charles S. Bagley, 1314 Ohio Ave., Alamogordo, N. Mex. 88310

[21] Appl. No.: 7,363

[22] Filed: Jan. 27, 1987

Related U.S. Application Data

[63] Continuation-in-part of Ser. No. 689,862, Jan. 9, 1985, abandoned, which is a continuation-in-part of Ser. No. 426,122, Sep. 28, 1982, abandoned.

[51] Int. Cl.$^4$ ................................................. F02C 3/10
[52] U.S. Cl. ........................................ 60/261; 60/262; 60/270.1
[58] Field of Search ...................... 60/39.36, 241, 261, 60/262, 263, 269, 270.1, 39.37

[56] References Cited

U.S. PATENT DOCUMENTS

| | | | |
|---|---|---|---|
| 4,036,020 | 7/1977 | Bagley | 60/644 |
| 4,051,671 | 10/1977 | Brewer | 60/262 |
| 4,063,415 | 12/1977 | Rhoades | 60/201 |
| 4,631,916 | 12/1986 | LeTanter et al. | 60/262 |

*Primary Examiner*—Louis J. Casaregola
*Attorney, Agent, or Firm*—Mallinckrodt & Mallinckrodt

[57] ABSTRACT

An air breathing, jet propulsion engine of either ram jet or turbojet type is provided by an open-ended, elongate, tubular casing having a lead section at one open end thereof and means associated with said section for compressing entering air substantially adiabatically, and having a smaller, open ended, elongate, and perforate tubular member as a combustion chamber positioned concentrically within and along the casing to form therewith a relatively short intermediate section defining a convergent annular entry followed by an annular throat as the sole thrust nozzle and a discharge passage around and along the perforate tubular member providing a discharge section, such passage being wholly and progressively divergent to termination thereof at the opposite open end of the casing as a thrust orifice. A burner provides for combustion of fuel in the combustion chamber, whereby mass flow of gases of combustion through the perforations of the perforate member into the expanding supersonic airstream passing therearound heats such airstream and increases its velocity. The perforate tubular member is preferably equipped for adjustment of the opening size of its perforations and for adjustment of its position longitudinally with respect to the casing.

6 Claims, 1 Drawing Sheet

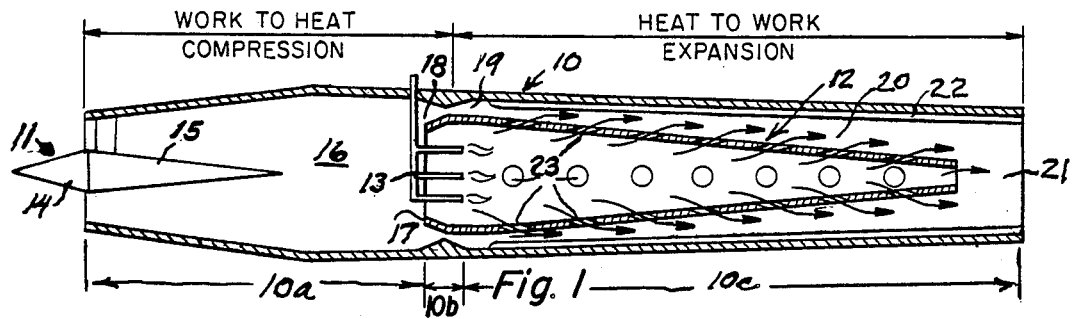
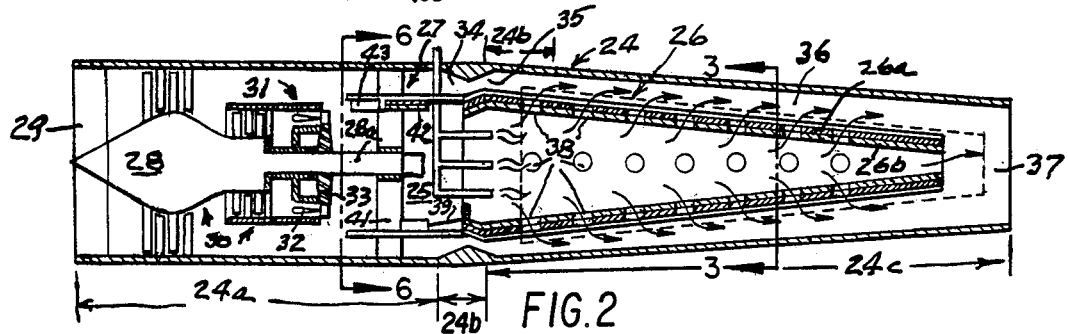
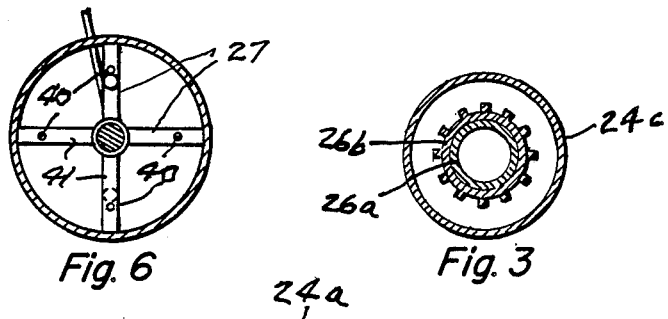
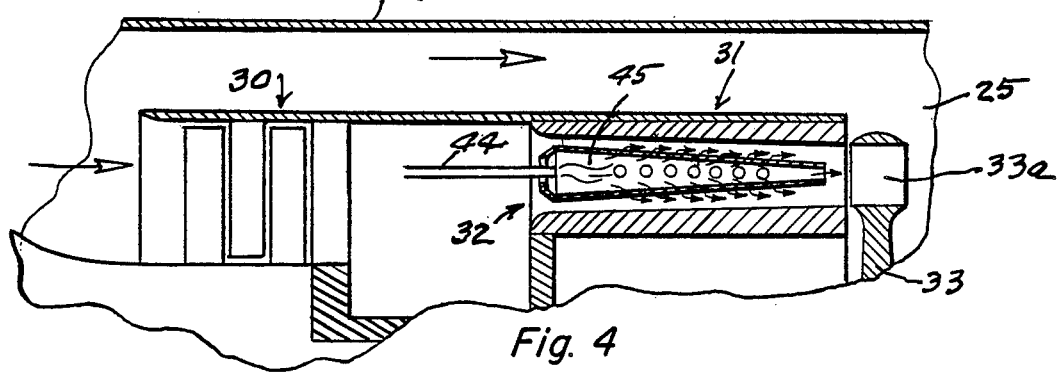
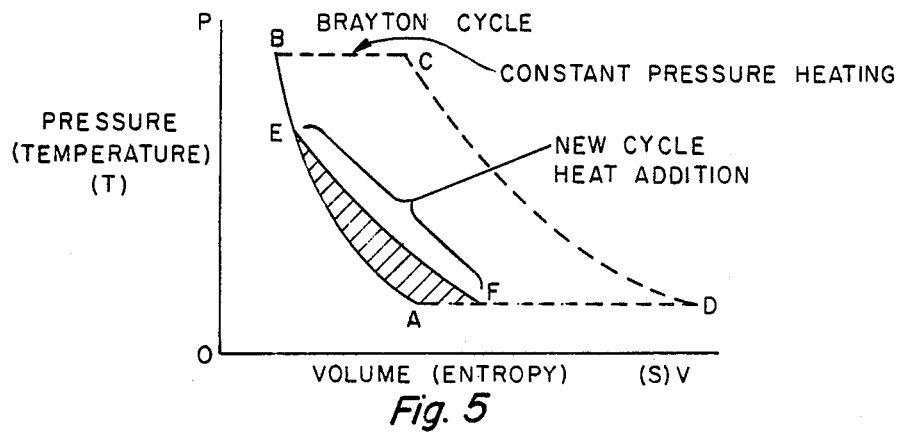

JET PROPULSION ENGINE AND METHOD

RELATED APPLICATIONS

This application is a continuation-in-part of my copending Application Ser. No. 06/689,862, filed Jan. 9, 1985 (abandoned), which itself is a continuation-in-part of my Application Ser. No. 06/426,122, filed Sept. 28, 1982, entitled "Jet Propulsion Engine" (abandoned).

BACKGROUND OF THE INVENTION

1. Field

The Invention is in the field of air-breathing, jet propulsion engines and methods of operating same.

2. State of the Art

The basic gas-turbine cycle employed in present air-breathing jet propulsion engines is the Brayton cycle, which is the nearest practical approach to the Carnot cycle regarded as ideal, i.e. no cycle can possibly be more efficient for operation of heat engines. The Brayton cycle includes adiabatic compression, wherein the enthalpy is increaased by mechanical work, constant pressure heating to further increase the enthalpy, and adiabatic expansion wherein a limited portion of the enthalphy is converted to velocity.

Adiabatic compression is thermodynamically a reversible process, i.e. isentropic, and the compressor work is essentially all recoverable as equivalent kinetic energy during expansion of the compressed fluid in a suitable nozzle. The same is not true of thermal energy added to the fluid at constant pressure. Such energy addition is largely an irreversible process and the main cause of low thermodynamic efficiencies in current, air breathing, jet propulsion engines. In those cases in which pressure ratios would require De Laval type convergent-divergent nozzles for complete expansion of the fluid, the recoverable portion of the enthalpy of the fluid in the divergent, i.e. supersonic, part of the nozzle is due almost entirely to compressor work that is non-productive so far as conversion of added heat to work is concerned. The productive portion of the fluid cycle derives from the limited advantage that can be gained by raising the temperature, thereby increasing the critical or acoustic velocity which is the maximum that can be attained in nozzles of the convergent type. This has led to the exclusive use of convergent type nozzles in jet engines and a trend toward ever higher temperatures in order to obtain higher velocities and more favorable ratios between productive and non-productive work. The quantity of heat required to secure a given velocity in this way, however, is always more than that required to obtain equivalent kinetic energy, because the higher the velocity that can be obtained, the higher the exhaust temperature and, consequently, the greater the heat loss. It is common in present jet engines for the energy lost to be twice as much as the energy converted to velocity.

Thermal efficiency of conventional jet engines is increased to a limited extent by raising both the engine pressure ratio and the maximum gas temperature. However, in order to maximize this advantage, compressors designed to achieve very high pressure ratios, of the order of 40:1, are necessary. The maximum temperature of the gases entering the turbine is limited by metallurgical and stress considerations, making the use of costly materials and intricate cooling provisions mandatory. However, in spite of these expediences, the ratio of velocity output to its equivalent heat input is still very poor, i.e. less than 50% at best. This dilemma results from two false premises. The first one is that heat has a variable qualitative property, relating to its ability to convert to work, that increases as the absolute temperature increases. The second one is that entropy is a physical property of heat that absorbs all "low quality" heat (the lower the absolute temperature the lower the quality) and consumes it as a part of the hypothetical heat death. As a consequence of the first premise, current design avoids adding heat to the working fluid at any but the highest possible temperatures. The second premise imposes the condition that "no heat engine can convert all of the heat supplied into work", which is undoubtedly true, and "the maximum amount of heat that can possibly be transformed into work is that of the Carnot cycle", which is undoubtedly false, because the variable qualitative property of heat is made explicit in the Carnot cycle formula.

Experiments with a nozzle of the type described herein show that large amounts of heat can be added to a supersonic stream of air, thereby increasing its velocity without substantially increasing its temperature.

SUMMARY OF THE INVENTION

According to the present invention, an air-breathing, jet propulsion engine is provided to operate on a cycle of adiabatic compression of an airstream to at least twice atmospheric pressure, adiabatic expansion of the air stream to sonic velocity, and then isothermal expansion of the airstream with convective and radiative heat addition to the supersonic air stream such that the added heat is converted to velocity as the pressure falls to that of the ambient atmosphere.

As here used, adiabatic compression means compression without heat removal, and adiabatic expansion means expansion without heat addition. Isothermal compression means compression with heat removal, and isothermal expansion means expansion with heat addition.

In accordance with the invention, provision is preferably made for adjustment of the important structural features of the engine to attain desired operating advantages.

The engine comprises an open-ended, tubular casing having a first section, which has a diffusion means (including a plenum chamber) for compressing an air stream adiabatically to at least twice atmospheric pressure, a second relatively short section having a rounded orifice of De Laval type defining a convergent entry to an annular throat for adiabatically expanding the airstream to sonic velocity and constituting the intake portion of a nozzle, and a third section providing an elongate, wholly and progressively divergent, thrust nozzle portion for isothermally expanding the airstream and adding heat thereto. Means are provided for injecting mass heat into the supersonic airstream passing through the divergent discharge positon of the nozzle.

The nozzle includes a smaller, open-ended, elongate, perforate, cone-shaped combustion chamber, concentrically mounted in and along the interior axis of the thrust nozzle. Such combustion chamber, in cooperation with the casing, forms the inlet orifice, the throat, and the elongate, progressively divergent discharge portion of the nozzle.

For adjustment purposes, the combustion chamber is preferably mounted within the casing for movement a selected distance upstream or downstream of the air flow through the nozzle, thereby altering the size of the annular inlet and effecting variable control of the bypass ratio between airflow through the combustion chamber and airflow through the annular intake portion of the nozzle.

Further, the combustion chamber may consist of two elongate perforate cones, with provision for turning one of the cones relative to the other to adjust the size of the openings leading into the surrounding supersonic velocity stream. Pressure in the combustion chamber approximates that of the adjacent plenum chamber wherein no combustion takes place, and is at least twice that of the surrounding airstream into which convective mass flow of the hot products of combustion takes place.

THE DRAWING

In the accompanying drawing which illustrates the best mode presently contemplated of carrying out the invention:

FIG. 1 is a schematic view in longitudinal section of a ram jet engine incorporating the present invention;

FIG. 2, a similar view of a turbo jet engine incorporating the present invention and the adjustment features thereof;

FIG. 3, a transverse section taken along line 3—3 of FIG. 2;

FIG. 4, a fragmentary view in longitudinal section drawn to a considerably larger scale and showing one of the component high pressure injection nozzles of the engine of FIG. 2 operative against the turbine of such turbo jet engine;

FIG. 5, a graph plotting pressure against volume on a comparative scale; and

FIG. 6, a transverse section taken along line 6—6 of FIG. 2

DETAILED DESCRIPTION OF THE ILLUSTRATED EMBODIMENTS

As illustrated in FIG. 1, a ramjet engine according to the present invention includes an external, open-ended, elongate, tubular casing 10, air compressing means comprising a nose cone 11 mounted in the casing at the leading end thereof; an elongate, open-ended, perforate, cone-shaped combustion chamber 12 concentrically mounted internally of and extending along the casing toward the discharge end thereof, defining, with the casing, a jet nozzle; and a burner 13 having fuel injection and ignition means and being mounted at the leading end of the perforate combustion chamber 12. Looking in the direction of airflow through the engine, i.e. from left to right in the drawing, the casing 10 in this instance has a leading section 10a, a second, relatively short, intermediate section 10b, and a third, elongate, wholly and progressively divergent discharge section 10c.

The nose cone 11 is as usual formed of two oppositely-directed, base-to-base conical sections 14 and 15 and is mounted in the open, air inlet end of the casing, the base section 14 being supersonic and protruding forwardly of the casing and the base section 15 being subsonic and extending into the interior of the casing. The nose cone and the divergent portion of section 10a of the casing form a conventional diffusion system for decelerating a supersonic stream of air flowing toward the inlet of the nozzle portion of the engine. The space 16 of casing section 10a between the trailing end of the nose cone 15 and the leading end of combustion chamber 12 forms a plenum chamber for further decelerating the airstream within the casing to low, subsonic velocity.

The illustrated configuration effects compression of the air adiabatically to at least twice ambient pressure. Various other configurations will do likewise.

The combustion chamber 12 and the casing sections 10b and 10c combine to first form a convergent thrust nozzle through which air flows. The leading edge margin 17 of the combustion chamber provides a rounded orifice, which, with the casing, forms a convergent annular entry 18 followed by an annular throat 19. The trailing portion of combustion chamber 12 is convergent in the direction of airflow and, with the casing, forms an elongate, divergent thrust nozzle discharge passage 20 which is wholly and progressively divergent to the opposite open end of the casing 10 which serves as a thrust orifice 21.

Ram air entering the engine through its forward opening at high velocity is compressed to more than twice ambient by diffusion on a work-to-heat basis adiabatically in the leading section 10a of the casing. Further adiabatic compression takes place in plenum chamber 16 as the airstream is further decelerated to a subsonic velocity. The airstream is then accelerated and adiabatically expanded in entry 18 to supersonic velocity at throat 19, and is expanded isothermally in divergent nozzle passage 20 between the casing and trailing portion of tail cone 12.

Burner 13 is mounted at the open upstream end of the combustion chamber adjacent to plenum chamber 16. Fuel is supplied to burner 13 and is burned in the low velocity, subsonic airflow within the combustion chamber, which is surrounded by the supersonic airstream flowing through the wholly and progressively divergent, nozzle discharge passage 20. Mass heat from the combustion is transmitted by convection to such airstream through outlet openings 23 in perforated combustion chamber 12, which preferably slope toward the downstream, i.e. discharge, end of casing 10. The supersonic velocity airstream absorbs the heat and converts it into increased velocity. Since the source of heat is centrally located along the axis of the airstream, there is no direct transfer of heat from the combustion zone to the casing and little or no consequent loss of heat to the atmosphere. On the contrary, at supersonic velocity of the flowing airstream, heat caused by friction thereof against the internal wall surfaces of casing 10 and of internal fins 22 thereof, which are preferably provided, is transferred by radiation to the much cooler supersonic airstream. Further, because the pressure in the combustion chamber approximates that of the plenum 16, where no combustion takes place, it is at least twice that of the surrounding airstream into which convective mass flow of the hot products of combustion takes place. Furthermore, since absorption of heat takes place while pressure of the airstream is decreasing, there can be no consequent anomalous increase in entropy or unavailability of heat. Once throat 19 is passed, any heat in the airstream will cause expansion, which has only one direction to go, i.e. in the direction of airflow. It should be noted that the thrust nozzle, comprising convergent entry 18 and throat 19, is the sole thrust nozzle for the casing 10 as contrasted with Rhoades, U.S. Pat. No. 4,063,415 of Dec. 20, 1977, wherein the effective throat nozzle for the engine is immediately upstream of the thrust orifice.

FIGS. 2 and 3 illustrate a turbojet application of the present invention, with provision for adjusting placement and size of nozzle throat and the size of the holes through the perforated walls of the combustion chamber. The turbojet engine includes an open-ended, tubular casing 24, having a leading cylindrical section 24a within which are mechanical air compressing and turbo means and a plenum chamber 25. Casing 24 also has an intermediate section 24b corresponding to intermediate section 10b of FIG. 1, and a discharge section 24c corresponding to discharge section 10c of FIG. 1 and including an elongate, perforated combustion chamber 26 made up of dual, concentric, perforated tubular sections 26a and 26b and adjustable in position longitudinally of casing 24, see dotted line position, by means of an adjustable mounting shown schematically at 27.

A conventional, rotary, nose cone 28, equipped with usual compressor blades, is mounted just inside the open inlet end 29 of the casing and provides a conventional low pressure fan section 30. A high pressure compressor and turbo section 31 is located immediately downstream from low pressure section 30 and is of conventional construction except, as illustrated in FIG. 4, its thrust nozzles 32 are each preferably constructed as is the combustion chamber nozzle section 12, 10b, 10c of FIG. 1. Such injection nozzles provide full area admission to the turbine blades 33a of a turbine wheel 33, which is fixedly mounted on a shaft portion 28a of rotary nose cone 28 and effects rotation of such nose cone.

Other than has just been described, the tubojet engine of FIGS. 2 and 3 is substantially the same as the ramjet engine of FIG. 1. Thus, casing 24 defines, with combustion chamber 26, a convergent nozzle entry 34 and a nozzle throat 35, and the elongate, discharge section 24c, defines, with combustion chamber 26, an elongate, wholly and progressively divergent nozzle discharge passage 36 terminating in a thrust orifice 37, the thrust nozzle comprising convergent entry 34 and throat 35 constituting the sole thrust nozzle for casing 24.

For adjusting the amount of the gaseous products of combustion that flow from the interior of combustion chamber 26 through outlet openings 38 (which also preferably, though here not shown so, slope toward the discharge end of casing 24) into the supersonic airstream flowing around and along such combustion chamber, one of the tubular sections thereof is rotatable relative to the other so the size of gas flow-through openings 38 is adjustable. Here, inner tubular section 26b is rotatable relative to stationary tubular section 26a by means of a manually or power operated gear drive schematically indicated at 39, whose controls extend through the wall of casing 24 for easy access and enable section 26b to be turned in either direction relative to section 26a so as to bring its openings more or less into registry with the openings of section 26b.

For adjusting the position and size of nozzle entry 34 and nozzle throat 35, the two concentric sections of combustion chamber 26 are mounted within casing 24, as by means of rods 40, FIGS. 4 and 6, supported by a stationary spider 41 for limited movement back and forth along casing 24. Such limited movement may be manually or power operated by any suitable means, such as by a screw shaft 42 turned in one or the other direction by a reversable electric motor 43, controlled exteriorly of casing 24, to move combustion chamber 26 backwardly or forwardly within casing 24.

In the operation of the turbojet engine of FIG. 2, a large volume of air is compressed in low pressure fan section 30. A substantial part of the mass flow bypass high pressure section 31 and flows into plenum chamber 25. The remainder of the air is directed through high pressure section 31 and discharges onto turbine wheel 34 through the turbo injection nozzles 32. Turbine wheel 33 drives the low pressure compressor fan, which approximately doubles the inlet air pressure, and also drives the high pressure compressor and turbo fan, which again approximately doubles the air pressure.

The air flowing into each nozzle 32 is decelerated and heated by means of a burner 44. Operation is essentially the same for each nozzle 32 as it is for the sole thrust nozzle 34, 35 and progressively, divergent nozzle discharge passage 36 of such turbojet engine and for the sole thrust nozzle 18, 19 and progressively divergent nozzle discharge passage 20 of the ram jet of FIG. 1. It should be noted that, so long as the nozzle discharge passage is wholly and progressively divergent along the length thereof to the discharge orifice, the casing section of the nozzle and the combustion chamber, which together define such discharge passage, may be of any convenient geometrical formation. However configurated, combustion takes place in a protected, low velocity, subsonic zone 45 that is surrounded throughout its length by working fluid which absorbs the heat at supersonic velocity and converts it into increased velocity. Thus, heat is added to the high pressure air just ahead of turbine wheel 33 by means of the turbo injection nozzles 32, only one of which is illustrated in FIG. 4, and, again, heat is added in the nozzle discharge passage 36 of FIG. 2 to increase velocity of discharge through thrust orifice 37.

In operation of all embodiments of the invention, stoichiometric combustion of fuel and air within the combustion chamber injects enormous amounts of heat into an airstream which is already expanding at supersonic velocity in the divergent discharge pasage of the nozzle, where it is narrowly confined. While the combustion temperature can be very high, the airstream which absorbs the heat of combustion has a relatively low temperature that is not significantly increased by the addition of heat, since, as rapidly as it is absorbed, the heat is converted to its equivalent velocity. Under some conditions, depending on the pressure ratio, the temperature may decrease and approach that of the ambient atmosphere. As a consequence, the nozzle exit velocities are brought closer to the equivalent kinetic energy of the heat absorbed.

In the turbojet configuration of FIG. 2, the same principles of thermodynamic conversion apply in the gas turbine nozzles as in the thrust nozle. Accordingly, turbine inlet temperatures are lower and velocities higher, making it unnecessary to provide turbine blade cooling and very strong high-temperature resistant materials for turbine wheel and blade construction. In addition, compression ratios are much lower, on the order of 2 to 1, thus making construction less complicated and less expensive in comparison with conventional turbojet compressors, which have compression ratios of 13 to 1 or higher.

FIG. 5 is a pressure vs. volume diagram for the conventional Brayton cycle, ABCDA, and for the cycle of the present invention, ABEFA. In the Brayton cycle, AB represents compression of the fluid, BC represents the addition of heat at constant pressure, CD represents expansion in the nozzle, and DA represents the constant pressure cooling of the fluid to ambient atmospheric temperature. DA is an indication of the difference between nozzle discharge temperature and atmospheric temperature, and, thus, the thermal energy loss resulting from the high discharge temperatures in the Brayton cycle.

Comparing the present invention with the Brayton cycle, AB represents compression of the fluid and BEF represents expansion in the nozzle. BE represents adiabatic expansion of the compressible fluid ahead of the nozzle throat, while EF represents isothermal expansion beyond the throat with heat addition. The work done along CD of the Brayton cycle is equal to that done along BEF. FA represents constant pressure cooling and is an indication of thermal energy loss using the nozzle of the present invention. Comparison of FA with Da shows that because of the much lower discharge temperature, the thermal energy loss in the present nozzle is much less than that of the Brayton cycle.

The compression in the plenum chamber of the first section of the engine must be to at least twice atmospheric pressure so that subsonic velocity results as the gas expands through the throat in the second seciton of the nozzle.

While the invention has been described with reference to specifically illustrated embodiments presently regarded as the best mode of carrying out the invention in actual practice, it should be realized that various changes may be made without departing from the disclosed inventive subject matter that is particularly pointed out and claimed herebelow.

I claim:

1. An air breathing, jet propulsion engine, comprising an open-ended, elongate, tublur casing having a lead section at one open end thereof with means adapted to receive a stream of atmospheric air and compress it substantially adiabatically to at least twice ambient pressure, a second, relatively short, intermediate section in longitudinal alignment and flow communication with said first section, and a third, elongate, discharge section at the opposite open end of the casing and in longitudinal alignment and flow communication with said second section; a smaller, open-ended, elongate and perforate tubular member concentrically positioned within said second and third sections of the casing as a combustion chamber and configured to define with said casing as the entrance to said second section thereof a thrust nozzle having an annular, convergent entry for air followed by an annular throat for initiating supersonic flow of air and to define, further, a wholly and progressively divergent discharge passage around and along said perforate tubular member which opens at said opposite open end of the casing as a thrust orifice for supersonic flow of a heated, nozzle airstream from around the combustion chamber, said discharge passage being in flow communication with the combustion chamber along the length thereof by way of the perforations of said perforate tubular member; and means for establishing combustion within said combustion chamber for mass transfer by convection of hot gases from said ombustion chamber to said supersonic flow of air so as to supply heat to and increase velocity of the airstream flowing through said wholly divergent discharge passage and out said thrust orifice, wherein the engine is of turbojet configuration having air pressurizing turbine means in the lead section of the casing, said turbine means comprising a turbine wheel, a low pressure fan section, and a relatively high pressure compressor and turbo section having nozzles directed against said turbine wheel, the nozzles of the turbine means each substantially conforming structurally and functionally to the nozzle of the intermediate and discharge sections of the casing.

2. An air breathing, jet propulsion engine, comprising an open-ended, elongate, tubular casing having a lead section at one open end thereof with means adapted to receive a stream of atmospheric air and compress it substantially adiabatically to at least twice ambient pressure, a second, relatively short, intermediate section in longitudinal alignment and flow communication with said first section, and a third, elongate, discharge section at the opposite open end of the casing and in longitudinal alignment and flow communication with said second section; a smaller, open-ended, elongate and perforate tubular member concentrically positioned within said second and third sections of the casing as a combustion chamber and configured to define with said casing as the entrance to said second section thereof a thrust nozzle having an annular, convergent entry for air followed by an annular throat for initiating supersonic flow of air and to define, further, a wholly and progressively divergent discharge passage around and along said perforate tubular member which opens at said opposite open end of the casing as a thrust orifice for supersonic flow of a heated, nozzle airstream from around the combustion chamber, said discharge passage being in flow communication with the combustion chamber along the length thereof by way of the perforations of said perforate tubular member; and means for establishing combustion within said combustion chamber for mass transfer by convection of hot gases from said combustion chamber to said supersonic flow of air so as to supply heat to and increase velocity of the airstream flowing through said wholly divergent discharge passage and out said thrust orifice, wherein the perforate tubular member is equipped with means for adjusting the extent to which the perforations thereof are open for controlling flow of heating fluid into the discharge passage, and wherein the perforate tubular member is also equipped with means for adjusting its position longitudinally with respect to the casing.

3. An air breathing, jet propulsion engine comprising an open-ended, elongate, tubular casing having a lead section at one open end thereof with means adapted to receive a stream of atmospheric air and compress it substantially adiabatically to at least twice ambient pressure, a second, relatively short, intermediate section in longitudinal alignment and flow communication with said first section, and a third, elongate, discharge section at the opposite open end of the casing and in longitudinal alignment and flow communication with said second section; a smaller, open-ended, elongate and perforate tubular member concentrically positioned within said second and third sections of the casing as a combustion chamber and configured to define with said casing as the entrance to said second section thereof a thrust nozzle having an annular, convergent entry for air follow by an annular throat for initiating supersonic flow of air and to define, further, a wholly and progressively divergent discharge passage around and along said perforate tubular member which opens at said opposite open end of the casing as a thrust orifice for supersonic flow of a heated, nozzle airstream from around the combustion chamber, said discharge passage being in flow communication with the combustion chamber along the length thereof by way of the perforations of said perforate tubular member; and means for establishing combustion within said combustion chamber for mass transfer by convection of hot gases from said combustion chamber to said supersonic flow of air so as to supply heat to and increase velocity of the airstream flowing through said wholly divergent discharge passage and out said thrust orifice, and wherein the perforate tubular member is also equipped with means for adjusting its position longitudinally with respect to the casing.

4. An air breathing, jet propulsion engine according to claim 1, wherein the perforations in the perforate tubular member slant from the combustion chamber in the downstream direction of gas flow through the discharge passage.

5. An air breathing, jet propulsion engine according to claim 2, wherein the perforations in the perforate tubular member slant from the combustion chamber in the downstream direction of gas flow through the discharge passage.

6. An air breathing, jet propulsion engine according to claim 3, wherein the perforations in the perforate tubular member slant from the combustion chamber in the downstream direction of gas flow through the discharge passage.

* * * * *